US011821063B2

(12) United States Patent
Wang et al.

(10) Patent No.: US 11,821,063 B2
(45) Date of Patent: Nov. 21, 2023

(54) HIGH-STRENGTH STEEL ALLOWING LOW-TEMPERATURE WELDING AND HIGH-HEAT INPUT WELDING AND PRODUCTION METHOD THEREOF

(71) Applicant: Northeastern University, Shenyang (CN)

(72) Inventors: Chao Wang, Shenyang (CN); Junjie Hao, Shenyang (CN); Guo Yuan, Shenyang (CN); Jian Kang, Shenyang (CN); Zhenlei Li, Shenyang (CN); Guodong Wang, Shenyang (CN)

(73) Assignee: NORTHEASTERN UNIVERSITY, Shenyang (CN)

( * ) Notice: Subject to any disclaimer, the term of this patent is extended or adjusted under 35 U.S.C. 154(b) by 0 days.

(21) Appl. No.: 17/877,843

(22) Filed: Jul. 29, 2022

(65) Prior Publication Data

US 2023/0175105 A1   Jun. 8, 2023

(30) Foreign Application Priority Data

Dec. 8, 2021  (CN) .......................... 202111490007.2

(51) Int. Cl.

| | |
|---|---|
| *C22C 38/14* | (2006.01) |
| *C22C 38/02* | (2006.01) |
| *C22C 38/04* | (2006.01) |
| *C22C 38/06* | (2006.01) |
| *C22C 38/00* | (2006.01) |
| *B23K 35/30* | (2006.01) |
| *C21D 8/00* | (2006.01) |
| *B23K 103/04* | (2006.01) |

(52) U.S. Cl.
CPC .......... *C22C 38/14* (2013.01); *B23K 35/3093* (2013.01); *C21D 8/005* (2013.01); *C22C 38/002* (2013.01); *C22C 38/02* (2013.01); *C22C 38/04* (2013.01); *C22C 38/06* (2013.01); *B23K 2103/04* (2018.08)

(58) Field of Classification Search
None
See application file for complete search history.

(56) References Cited

U.S. PATENT DOCUMENTS

2003/0121577 A1*  7/2003  Choi ....................... C22C 38/04
                                                                  148/330

* cited by examiner

*Primary Examiner* — Anthony M Liang
(74) *Attorney, Agent, or Firm* — Don D. Cha; HDC Intellectual Property Law, LLP

(57) ABSTRACT

A high-strength steel allowing low-temperature welding and high-heat input welding and a production method thereof are provided, which belongs to the technical field of steel production. The high-strength steel includes the following chemical components by mass fraction: 0.03-0.16% of C, 0.05-0.5% of Si, 1.0-1.9% of Mn, 0.002-0.02% of P, 0.001-0.01% of S, 0.005-0.07% of Al, 0.005-0.04% of Ti, 0.1-0.5% of Cr, 0.0005-0.005% of B, 0.002-0.01% of Mg+Zr, 0.001-0.008% of O, 0.004-0.01% of N, and the balance of Fe and residual elements. Magnesium and zirconium are added to form magnesium/zirconium oxide, titanium and boron are added to form titanium/boron nitride, and the two types of precipitates work synergistically to improve the microstructure of a heat-affected zone. The method optimizes the chemical composition and production process of existing high-strength steel.

6 Claims, 1 Drawing Sheet

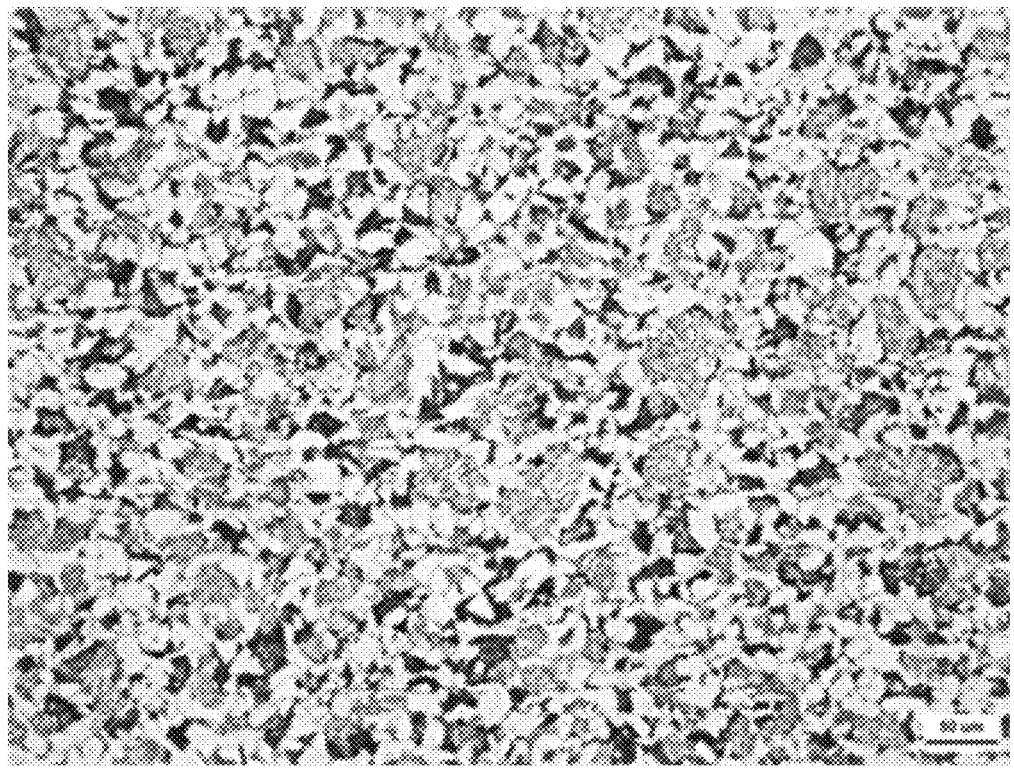

HIGH-STRENGTH STEEL ALLOWING LOW-TEMPERATURE WELDING AND HIGH-HEAT INPUT WELDING AND PRODUCTION METHOD THEREOF

CROSS REFERENCE TO RELATED APPLICATION

This patent application claims the benefit and priority of Chinese Patent Application No. 202111490007.2, filed on Dec. 8, 2021, the disclosure of which is incorporated by reference herein in its entirety as part of the present application.

TECHNICAL FIELD

The present disclosure belongs to the technical field of steel production, and in particular, to a high-strength steel allowing low-temperature welding and high-heat input welding and a production method thereof.

BACKGROUND ART

In recent years, with the large-scale development of various engineering construction, the welding structure has been continuously developed towards high parameters, large scale and heavy scale, which requires for higher welding properties of steel. In the manufacturing process of large-scale structures, due to the complex structural form, different welding methods need to be used, and multiple welding passes are required. The preheating of the welding parts brings great inconvenience to the manufacturing process. Therefore, there is a significant need to reduce the preheating temperature or eliminate the preheating. In addition, using high-heat input welding technologies such as high-efficiency multi-wire submerged arc welding and electro-gas welding to replace the traditional welding process can improve the welding efficiency and shorten the construction period. Whether the preheating temperature is inappropriately decreased for low-temperature welding or the high-heat input welding is used, the properties of the welding parts tend to deteriorate significantly. In addition, in order to realize the production of high-strength steel, it is usually necessary to add high content of alloying elements such as Mo, Mn, and Cr, leading to a high cold crack sensitivity coefficient Pcm, which is contrary to the general desire to weld without preheating or low-temperature preheating in order to simplify the construction procedure and reduce the project cost in engineering construction. Therefore, there is an urgent need for high-strength steel allowing low-temperature welding and high-heat input welding to meet market and engineering needs.

The Chinese patent CN110541117A discloses a 620 MPa grade high-performance bridge steel welded at a low preheating temperature and a preparation method thereof, which is characterized in that through the low-carbon design, Nb—Ti microalloying is conducted, the contents of P and S are controlled, and the number and form of inclusions in the steel are controlled through Ca, so as to meet the needs of strength grade and preheating temperature. However, this technical solution can only achieve low preheating temperature welding, and cannot further improve the welding heat input.

The Chinese patent CN103422021A discloses a low-yield-ratio structural steel with a yield strength equal to or greater than 550 MPa and a production method thereof, which is characterized in that the content of Mg is controlled, such that Mg and Als combine with [O] to form fine oxide particles, and TiN uses the oxide particles as the nucleation core to adhere to the surface of these oxides to precipitate fine and complex particles, so as to refine the microstructure of the matrix and the heat-affected zone and avoid preheating in the welding process. However, this solution does not optimally control the distribution of oxides and nitrides, and cannot combine preheating-free welding and high-heat input welding.

The Chinese patent CN111748737A discloses an easy-to-weld ultra-high strength steel with a cold crack sensitivity coefficient less than or equal to 0.25 and a production method, which is characterized in that the strength of the steel is ensured by the precipitation strengthening of Ti, and the subsequent tempering further promotes the precipitation of TiN and TiC particles, so as to prevent grain growth in the heat-affected zone during welding and improve the welding properties. This solution adopts a separate Ti precipitation strengthening technology, which has insufficient ability to control the microstructure and properties under various welding conditions.

The Chinese patent CN109628827A discloses a low-temperature welding crack-sensitive high-strength steel plate HYQ620 and a production method thereof, which is characterized by strictly controlling the content of harmful elements such as P and S in the steel that affect the toughness of the steel plate by properly adjusting the content and proportion of alloying elements such as C, Mo, and Nb, so as to ensure the low-temperature welding crack sensitivity of the steel. This solution cannot achieve both low-temperature welding and high-heat input welding properties only by adjusting the element content.

According to the prior art, improving the low-temperature welding properties of steel is mainly achieved by optimizing the alloy component to obtain a low cold crack sensitivity coefficient. However, the steel using this technical means lacks the means to deal with the deterioration of the microstructure and properties of the heat-affected zone during high-heat input welding, which is difficult to meet the needs of the industry for high-heat input welding properties. By optimizing the alloy component and introducing oxide-type or nitride-type particles, both low-temperature welding properties and certain high-heat input welding properties can be achieved. However, the types of particles introduced in the prior art are single, and the ability to control the properties of the heat-affected zone is limited, which is difficult to meet the property requirements under various welding conditions in practical applications.

SUMMARY

In view of the deficiencies in the prior art, the present disclosure provides a high-strength steel allowing low-temperature welding and high-heat input welding and a production method thereof. The method optimizes the component and production process of existing high-strength steel. Under the existing production technology, by adjusting the alloy component and smelting process, the number and form of various nitrides and oxides are controlled to achieve both low-temperature welding properties and high-heat input welding properties.

In order to achieve the aforementioned objective, the present disclosure adopts the following technical solution.

A high-strength steel allowing low-temperature welding and high-heat input welding of the present disclosure includes the following chemical components by mass fraction: 0.03-0.16% of C, 0.05-0.5% of Si, 1.0-1.9% of Mn, 0.002-0.02% of P, 0.001-0.01% of S, 0.005-0.07% of Al, of Ti, 0.1-0.5% of Cr, 0.0005-0.005% of B, 0.002-0.01% of Mg+Zr, 0.001-0.008% of O, 0.004-0.01% of N, and the balance of Fe and residual elements.

A compound containing titanium nitride or boron nitride in the steel is recorded as titanium/boron nitride, and a compound containing magnesium oxide or zirconium oxide is recorded as magnesium/zirconium oxide. The area number density of the titanium/boron nitride particles with a size of 0.02-0.2 μm in the steel is recorded as $a/mm^2$ and the area number density of the magnesium/zirconium oxide particles with a size of 0.2-2 μm is recorded as $b/mm^2$. In steel matrix, a and b satisfy relational expressions $10<a/b<100$ and $10^4<a+10b<10^5$. In the heat-affected zone during steel welding, a and b satisfy relational expressions $5<a/b<50$ and $10^4<2a+10b<10^5$.

The steel may further include the following chemical components by mass fraction: one or more selected from the group consisting of 0.1-0.5% of Mo, 0.1-0.5% of Ni, 0.1-0.5% of Cu, of Nb, and 0.01-0.06% of V.

In the steel matrix, by a number of particles, 3-30% of the magnesium/zirconium oxide with a size of 0.2-2 μm may be attached with the titanium/boron nitride.

Under conditions that a preheating temperature of the steel is lower than 100° C. and a welding heat input is 5-50 kJ/cm, and under conditions that the preheating temperature is lower than 50° C. and the welding heat input is 50-500 kJ/cm, the heat-affected zone during welding may have impact toughness greater than or equal to 47 J at −40° C.

A production method of a high-strength steel allowing low-temperature welding and high-heat input welding of the present disclosure includes the following processing steps:

step 1, wire making:

conducting nitrogenation and oxygenation treatment on alloys of titanium, boron, magnesium and zirconium to obtain oxynitride alloys, crushing the oxynitride alloys into powder with a particle size less than 3 mm, and wrapping the powder with a steel strip to make alloy cored wires, where a core material of the alloy cored wires has a weight of 200-500 g/m and an outer diameter of 9-16 mm, and the steel strip has a thickness of 0.3-0.6 mm; and the core material of the alloy cored wires includes the following chemical components by mass fraction: 20-45% of Ti, 5-30% of Mg+Zr, 1-10% of B, 1-15% of N, 1-10% of O, 1-50% of Fe, 1-50% of Si, 1-50% of Mn, and residual elements; and installing the alloy cored wires on a wire feeder of a refining station;

step 2, steel smelting:

smelting molten iron and/or scrap steel into molten steel by a converter or electric furnace, tapping the steel to a ladle, and blowing an argon gas at a bottom during smelting and tapping;

transporting the ladle to the refining station for refining, and adjusting components and temperature of the molten steel, where a gas used during refining is an argon gas, and the molten steel is prevented from absorbing nitrogen in the air;

after dissolved oxygen of the molten steel is less than 0.001 wt. % and dissolved nitrogen is less than 0.004 wt. %, feeding the alloy cored wires; and adjusting alloy components of the molten steel to meet chemical component requirements of the high-strength steel allowing low-temperature welding and high-heat input welding, and leaving the station; and casting the molten steel with full protection to obtain a billet; and step 3, rolling:

sending the billet directly to a rolling mill for rolling, or hot charging or cold charging the billet into a heating furnace for heating at 1,150-1,300° C. for 30-300 min; and sending the heated billet the rolling mill for rolling, where the rolling mill conducts primary rolling at 1,100-1,250° C. and final rolling at 750-1,100° C.; and cooling the rolled steel to a room temperature, so as to obtain the high-strength steel allowing low-temperature welding and high-heat input welding.

In step 1, an alloy of titanium and boron may be subjected to nitrogenation treatment, an alloy of magnesium and zirconium may be subjected to oxygenation treatment, and the two alloys may be mixed to form cored wires or each made into cored wires for use in step 2.

In step 2, refining methods for the molten steel may be one or more selected from the group consisting of ladle furnace (LF) refining, Ruhrstahl-Heraeus (RH) refining, and vacuum degassing (VD) refining.

In step 2, the alloy cored wires may be fed at 100-200 m/min.

In step 2, after the alloy cored wires are fed, the molten steel may be bottom-blown with the argon gas for at least 3 min.

In step 3, the rolled steel may be subjected to on-line controlled cooling or off-line heat treatment.

The technical principle and design idea of the technical solution of the present disclosure are as follows:

The existing technology to improve the weldability of high-strength steel is mainly to improve the microstructure of the heat-affected zone by optimizing the alloy component and introducing oxide-type or nitride-type particles, so as to achieve preheating-free or low-temperature preheating welding, or achieve high-heat input welding. However, the types of inclusions used in the existing technology are single, and cannot be optimally controlled, and the microstructure improvement of the heat-affected zone is limited, which is difficult to meet the needs of different welding methods. In order to solve this problem, the present disclosure introduces various types of nitride-type and oxide-type inclusions into the steel by improving the alloy component and smelting process, and controls the size and proportion of each inclusion, such that the inclusions have a stronger microstructure improvement effect during welding to meet the needs of different welding processes.

The present disclosure ensures the basic strength of the steel through the combination of relatively cheap alloy elements such as carbon, silicon, manganese, and chromium, and further improves the strength of the steel through the combination of alloy elements such as molybdenum, nickel, copper, vanadium, and niobium, such that the steel can reach the property requirements of high-strength steel. Magnesium and zirconium are added to form magnesium/zirconium oxide, titanium and boron are added to form titanium/boron nitride, and the two types of precipitates work synergistically to improve the microstructure of the heat-affected zone, such that the high-strength steel has both low-temperature welding and high-heat input welding properties. In order to maximize the pinning and refining effect of the inclusions, through a large number of experimental studies, the effective type, optimal size, and number range of each inclusion are clarified, and the matching relationship of the content of key inclusions is defined. When the content satisfies a specific relationship, the optimal microstructure toughening effect of the heat-affected zone is achieved. Through the control of key processes and parameters in the production process, the target nitride and oxide distributions can be stably obtained, thereby achieving the objective of the present disclosure.

The present disclosure has the following advantages and beneficial effects:

1. The present disclosure enables the heat-affected zone during steel welding to obtain stronger microstructure control ability through the coordinated action of nitrides and oxides, which can significantly refine the microstructure of the heat-affected zone and improve the mechanical properties and comprehensive properties of the welding parts. Thus, the steel has both low-temperature welding and high-heat input welding properties.

2. In the prior art, a single nitride or oxide particle is often used, and it is difficult to control, which has a limited effect on improving the welding properties and is not conducive to popularization and application. The present disclosure can significantly improve the welding properties, can meet the requirements of different welding processes, and reduces the difficulty of process control, which is conducive to technical implementation, and can meet the urgent needs of high-strength steel allowing low-temperature welding and high-heat input welding in engineering construction.

BRIEF DESCRIPTION OF THE DRAWINGS

FIG. 1 is a photo of an optical microstructure of a heat-affected zone during welding of a high-strength H-beam allowing low-temperature welding and high-heat input welding in Example 2 of the present disclosure without preheating and with a welding heat input of 30 kJ/cm. It can be seen from the figure that a microstructure of the heat-affected zone during welding is significantly refined, and the welding properties are significantly improved.

DETAILED DESCRIPTION OF THE EMBODIMENTS

The specific implementation of the solution of the present disclosure will be described in detail below through the examples, but the protection scope of the present disclosure is not limited to the examples.

Example 1

In the present example, a high-strength steel plate allowing low-temperature welding and high-heat input welding included the following chemical components by mass fraction: 0.03% of C, 0.2% of Si, 1.9% of Mn, 0.002% of P, 0.0015% of S, 0.02% of Al, 0.02% of Ti, 0.005% of Mg+Zr, 0.004% of O, 0.004% of N, and the balance of Fe and residual elements. In a steel matrix, a number of titanium/boron nitrides with a size of 0.02-0.2 μm was a=32,000/mm$^2$, a number of magnesium/zirconium oxides with a size of 0.2-2 μm was b=2,100/mm$^2$, and a and b satisfied relational expressions $10<a/b<100$ and $10^4<a+10b<10^5$.

A preparation method for the above steel included the following processing steps: nitrogenation and oxygenation treatment were conducted on alloys of titanium, boron, magnesium, and zirconium to obtain oxynitride alloys. The oxynitride alloys were crushed into powder with a particle size less than 3 mm. The powder was wrapped with a steel strip to make alloy cored wires. A core material of the alloy cored wires had a weight of 300 g/m and an outer diameter of 10 mm, and the steel strip had a thickness of 0.3 mm. The core material of the alloy cored wires include the following chemical components by mass fraction: 20% of Ti, 20% of Mg+Zr, 5% of B, 3% of N, 6% of O, 15% of Fe, 15% of Si, 12% of Mn, and residual elements. The alloy cored wires were installed on a wire feeder of a refining station.

Molten iron was smelted into molten steel by a converter, the steel was tapped to a ladle, and an argon gas was blown at a bottom during smelting and tapping. The ladle was transported to the refining station for LF refining, and components and temperature of the molten steel were adjusted. A gas used during refining was an argon gas, and the molten steel was prevented from absorbing nitrogen in the air. After dissolved oxygen of the molten steel reached 0.0003 wt. % and dissolved nitrogen reached 0.0025 wt. %, the alloy cored wires were fed at 100 m/min, and the molten steel was bottom-blown with the argon gas for 3 min. Alloy components of the molten steel were adjusted to meet chemical component requirements of the high-strength steel allowing low-temperature welding and high-heat input welding, and the steel left the station. The molten steel was cast with full protection to obtain a billet.

The billet was hot charged into a heating furnace for heating at 1,150° C. for 60 min. The heated billet was sent to a steel plate mill for rolling, and subjected to primary rolling at 1,100° C. and final rolling at 780° C. The rolled steel was cooled to a room temperature, so as to obtain the high-strength steel plate allowing low-temperature welding and high-heat input welding.

Under conditions that a preheating temperature of the steel plate was 50° C. and a welding heat input was 15 kJ/cm, the heat-affected zone during welding had impact toughness of 240 J at −40° C. Under conditions of no preheating and a welding heat input of 300 kJ/cm, the heat-affected zone during welding had impact toughness of 270 J at −40° C. In the 15 kJ/cm heat-affected zone during welding of the steel plate, a number of titanium/boron nitrides with a size of 0.02-0.2 μm was a=24,000/mm$^2$, a number of magnesium/zirconium oxides with a size of 0.2-2 μm was b=1,300/mm$^2$, and a and b satisfied relational expressions $5<a/b<50$ and $10^4<2a+10b<10^5$.

Example 2

In the present example, a high-strength steel allowing low-temperature welding and high-heat input welding included the following chemical components by mass fraction: 0.16% of C, of Si, 1.6% of Mn, 0.004% of P, 0.002% of S, 0.02% of Al, 0.015% of Ti, 0.2% of Cr, 0.0015% of B, 0.008% of Mg+Zr, 0.003% of O, 0.006% of N, 0.1% of Mo, and the balance of Fe and residual elements. In a steel matrix, a number of titanium/boron nitrides with a size of 0.02-0.2 μm was a=34,500/mm$^2$, a number of magnesium/zirconium oxides with a size of 0.2-2 μm was b=2,600/mm$^2$, and a and b satisfied relational expressions $10<a/b<100$ and $10^4<a+10b<10^5$. By a number of particles, 15% of the magnesium/zirconium oxide with a size of 0.2-2 μm was attached with the titanium/boron nitride.

A preparation method for the above steel included the following processing steps: nitrogenation and oxygenation treatment were conducted on alloys of vanadium, titanium, magnesium, and calcium to obtain oxynitride alloys. The oxynitride alloys were crushed into powder with a particle size less than 3 mm. The powder was wrapped with a steel strip to make alloy cored wires. A core material of the alloy cored wires had a weight of 400 g/m and an outer diameter of 12 mm, and the steel strip had a thickness of 0.5 mm. The core material of the alloy cored wires include the following chemical components by mass fraction: 25% of V, 15% of Ti, 10% of Mg+Ca, 16% of N, 3% of O, 15% of Fe, 8% of Si, 5% of Mn, and residual elements. The alloy cored wires were installed on a wire feeder of a refining station.

Molten iron and scrap steel were smelted into molten steel by an electric furnace, the steel was tapped to a ladle, and an argon gas was blown at a bottom during smelting and tapping. The ladle was transported to the refining station for RH refining, and components and temperature of the molten steel were adjusted. A gas used during refining was an argon gas, and the molten steel was prevented from absorbing nitrogen in the air. After dissolved oxygen of the molten steel reached 0.0002 wt. % and dissolved nitrogen reached 0.003 wt. %, the alloy cored wires were fed at 120 m/min, and the molten steel was bottom-blown with the argon gas for 4 min. Alloy components of the molten steel were adjusted to meet chemical component requirements of the high-strength steel allowing low-temperature welding and high-heat input welding, and the steel left the station. The molten steel was cast with full protection to obtain a billet.

The billet was cold charged into a heating furnace for heating at 1,300° C. for 90 min. The heated billet was sent to a H-beam mill for rolling, and subjected to primary rolling at 1,250° C. and final rolling at 1,100° C. The rolled steel was cooled to a room temperature, so as to obtain the high-strength H-beam allowing low-temperature welding and high-heat input welding.

Under conditions of no preheating of the H-beam and a welding heat input of 30 kJ/cm, the heat-affected zone during welding had impact toughness of 160 J at −40° C. Under conditions that a preheating temperature was 45° C. and a welding heat input was 120 kJ/cm, the heat-affected zone during welding had impact toughness of 230 J at −40° C. In the 120 kJ/cm heat-affected zone during welding of the steel plate, a number of titanium/boron nitrides with a size of 0.02-0.2 μm was a=19,500/mm$^2$, a number of magnesium/zirconium oxides with a size of 0.2-2 μm was b=1,600/mm$^2$, and a and b satisfied relational expressions 5<a/b<50 and $10^4$<2a+10b<$10^5$.

Example 3

In the present example, a high-strength steel allowing low-temperature welding and high-heat input welding included the following chemical components by mass fraction: 0.07% of C, of Si, 1.3% of Mn, 0.002% of P, 0.004% of S, 0.03% of Al, 0.02% of Ti, 0.3% of Cr, 0.0035% of B, 0.006% of Mg+Zr, 0.006% of 0, 0.008% of N, 0.2% of Cu, 0.1% of Mo, and the balance of Fe and residual elements. In the steel matrix, a number of titanium/boron nitrides with a size of μm was a=42,500/mm$^2$, a number of magnesium/zirconium oxides with a size of 0.2-2 μm was b=3,500/mm$^2$, and a and b satisfied relational expressions 10<a/b<100 and $10^4$<a+10b<$10^5$. By a number of particles, 25% of the magnesium/zirconium oxide with a size of μm was attached with the titanium/boron nitride.

A preparation method for the above steel included the following processing steps: nitrogenation and oxygenation treatment were conducted on alloys of vanadium, titanium, magnesium, and calcium to obtain oxynitride alloys. The oxynitride alloys were crushed into powder with a particle size less than 3 mm. The powder was wrapped with a steel strip to make alloy cored wires. A core material of the alloy cored wires had a weight of 500 g/m and an outer diameter of 16 mm, and the steel strip had a thickness of 0.4 mm. The core material of the alloy cored wires include the following chemical components by mass fraction: 45% of Ti, 12% of Mg+Zr, 8% of B, 3% of N, 6% of 0, 20% of Fe, 1% of Si, 1% of Mn, and residual elements. The alloy cored wires were installed on a wire feeder of a refining station.

Molten iron and scrap steel were smelted into molten steel by a converter, the steel was tapped to a ladle, and an argon gas was blown at a bottom during smelting and tapping. The ladle was transported to the refining station for LF-RH refining, and components and temperature of the molten steel were adjusted. A gas used during refining was an argon gas, and the molten steel was prevented from absorbing nitrogen in the air. After dissolved oxygen of the molten steel reached wt. % and dissolved nitrogen reached 0.0025 wt. %, the alloy cored wires were fed at 150 m/min, and the molten steel was bottom-blown with the argon gas for 14 min. Alloy components of the molten steel were adjusted to meet chemical component requirements of the high-strength steel allowing low-temperature welding and high-heat input welding, and the steel left the station. The molten steel was cast with full protection to obtain a billet.

The billet was hot charged into a heating furnace for heating at 1,250° C. for 120 min. The heated billet was sent to a heavy and medium plate mill for rolling, and subjected to primary rolling at 1,200° C. and final rolling at 1,050° C. The steel plate had a thickness of 52 mm. The rolled steel was cooled to a room temperature and normalized at 900° C., so as to obtain the high-strength steel plate allowing low-temperature welding and high-heat input welding.

Under conditions that a preheating temperature of the steel plate was as low as 80° C. and a welding heat input was 5 kJ/cm, the heat-affected zone during welding had impact toughness of 220 J at −40° C. Under conditions of no preheating and a welding heat input of 500 kJ/cm, the heat-affected zone during welding had impact toughness of 180 J at −40° C. In the 500 kJ/cm heat-affected zone during welding of the steel plate, a number of titanium/boron nitrides with a size of 0.02-0.2 μm was a=27,500/mm$^2$, a number of magnesium/zirconium oxides with a size of 0.2-2 μm was b=2,600/mm$^2$, and a and b satisfied relational expressions 5<a/b<50 and $10^4$<2a+10b<$10^5$.

Example 4

In the present example, a high-strength steel plate allowing low-temperature welding and high-heat input welding included the following chemical components by mass fraction: 0.05% of C, 0.5% of Si, 1.9% of Mn, 0.006% of P, 0.003% of S, 0.01% of Al, 0.04% of Ti, 0.3% of Cr, of B, 0.01% of Mg+Zr, 0.008% of 0, 0.008% of N, 0.1% of V, 0.1% of Nb, and the balance of Fe and residual elements. In the steel, a number of titanium/boron nitrides with a size of 0.02-0.2 μm was 46,500/mm$^2$, and a number of magnesium/zirconium oxides with a size of 0.2-2 μm was 3,400/mm$^2$. By a number of particles, 8% of the magnesium/zirconium oxide with a size of 0.2-2 μm was attached with the titanium/boron nitride.

A preparation method for the above steel included the following processing steps: nitrogenation and oxygenation treatment were conducted on alloys of vanadium, titanium, magnesium, and calcium to obtain oxynitride alloys. The oxynitride alloys were crushed into powder with a particle size less than 3 mm. The powder was wrapped with a steel strip to make alloy cored wires. A core material of the alloy cored wires had a weight of 250 g/m and an outer diameter of 14 mm, and the steel strip had a thickness of 0.6 mm. The core material of the alloy cored wires include the following chemical components by mass fraction: 30% of Ti, 25% of Mg+Zr, 8% of B, 5% of N, 6% of 0, 10% of Fe, 8% of Si, 13% of Mn, and residual elements. The alloy cored wires were installed on a wire feeder of a refining station.

Molten iron and scrap steel were smelted into molten steel by an electric furnace, the steel was tapped to a ladle, and an argon gas was blown at a bottom during smelting and tapping. The ladle was transported to the refining station for LF-VD refining, and components and temperature of the molten steel were adjusted. A gas used during refining was an argon gas, and the molten steel was prevented from absorbing nitrogen in the air. After dissolved oxygen of the molten steel reached 0.0006 wt. % and dissolved nitrogen reached 0.0035 wt. %, the alloy cored wires were fed at 200 m/min, and the molten steel was bottom-blown with the argon gas for 4 min. Alloy components of the molten steel were adjusted to meet chemical component requirements of the high-strength steel allowing low-temperature welding and high-heat input welding, and the steel left the station. The molten steel was cast with full protection to obtain a billet.

The billet was directly sent to a rolling mill for rolling, and subjected to final rolling at 800° C. The rolled steel was cooled on-line to 630° C., and air-cooled to a room temperature, so as to obtain the high-strength steel plate allowing low-temperature welding and high-heat input welding.

Under conditions that a preheating temperature of the steel plate was 90° C. and a welding heat input was 30 kJ/cm, the heat-affected zone during welding had impact toughness of 200 J at −40° C. Under conditions that a preheating temperature was 40° C. and a welding heat input was 350 kJ/cm, the heat-affected zone during welding had impact toughness of 175 J at −40° C. In the 350 kJ/cm heat-affected zone during welding of the steel, a number of titanium/boron nitrides with a size of 0.02-0.2 μm was a=27,500/mm$^2$, a number of magnesium/zirconium oxides with a size of μm was b=2,400/mm$^2$, and a and b satisfied relational expressions 5<a/b<50 and 4<2a+10b<10$^5$.

Example 5

In the present example, a high-strength steel allowing low-temperature welding and high-heat input welding included the following chemical components by mass fraction: 0.08% of C, of Si, 1.5% of Mn, 0.003% of P, 0.003% of S, 0.02% of Al, 0.02% of Ti, 0.1% of Cr, 0.0025% of B, 0.06% of Mg+Zr, 0.005% of 0, 0.005% of N, 0.1% of Ni, 0.1% of Cu, and the balance of Fe and residual elements. In the steel, a number of titanium/boron nitrides with a size of 0.02-0.2 μm was 29,500/mm$^2$, and a number of magnesium/zirconium oxides with a size of 0.2-2 μm was 1,600/mm$^2$. By a number of particles, 20% of the magnesium/zirconium oxide with a size of 0.2-2 μm was attached with the titanium/boron nitride.

A preparation method for the above steel included the following processing steps: nitrogenation and oxygenation treatment were conducted on alloys of vanadium, titanium, magnesium, and calcium to obtain oxynitride alloys. The oxynitride alloys were crushed into powder with a particle size less than 3 mm. The powder was wrapped with a steel strip to make alloy cored wires. A core material of the alloy cored wires had a weight of 350 g/m and an outer diameter of 14 mm, and the steel strip had a thickness of 0.6 mm. The core material of the alloy cored wires include the following chemical components by mass fraction: 35% of Ti, 20% of Mg+Zr, 5% of B, 8% of N, 6% of 0, 5% of Fe, 10% of Si, 7% of Mn, and residual elements. The alloy cored wires were installed on a wire feeder of a refining station.

Molten iron and scrap steel were smelted into molten steel by an electric furnace, the steel was tapped to a ladle, and an argon gas was blown at a bottom during smelting and tapping. The ladle was transported to the refining station for RH refining, and components and temperature of the molten steel were adjusted. A gas used during refining was an argon gas, and the molten steel was prevented from absorbing nitrogen in the air. After dissolved oxygen of the molten steel reached 0.0008 wt. % and dissolved nitrogen reached 0.0035 wt. %, the alloy cored wires were fed at 180 m/min, and the molten steel was bottom-blown with the argon gas for 10 min. Alloy components of the molten steel were adjusted to meet chemical component requirements of the high-strength steel allowing low-temperature welding and high-heat input welding, and the steel left the station. The molten steel was cast with full protection to obtain a billet.

The billet was cold charged into a heating furnace for heating at 1,200° C. for 150 min. The heated billet was sent to a rolling mill for rolling, and subjected to primary rolling at 1,150° C. and final rolling at 1,100° C. The rolled steel was cooled to a room temperature. The steel plate was subjected to off-line quenching and tempering heat treatment, the quenching was conducted at 900° C., and the heating was conducted for 30 min, and the tempering was conducted at 580° C. for min, so as to obtain the high-strength steel plate allowing low-temperature welding and high-heat input welding.

Under conditions of no preheating of the steel plate and a welding heat input of 45 kJ/cm, the heat-affected zone during welding had impact toughness of 240 J at −40° C. Under conditions of no preheating and a welding heat input of 250 kJ/cm, the heat-affected zone during welding had impact toughness of 200 J at −40° C. In the 250 kJ/cm heat-affected zone during welding of the steel, a number of titanium/boron nitrides with a size of 0.02-0.2 μm was a=16,000/mm$^2$, a number of magnesium/zirconium oxides with a size of 0.2-2 μm was b=1,800/mm$^2$, and a and b satisfied relational expressions 5<a/b<50 and 10$^4$<2a+10b<10$^5$.

Comparative Example 1

In the comparative example, a high-strength steel plate included the following chemical components by mass fraction: 0.04% of C, 0.25% of Si, 1.85% of Mn, 0.002% of P, 0.002% of S, of Al, 0.02% of Ti, 0.005% of Mg+Zr, 0.004% of 0, 0.004% of N, 0.1% of Cr, 0.1% of Mo, 0.2% of Ni, and the balance of Fe and residual elements. In steel matrix, a number of titanium/boron nitrides with a size of 0.02-0.2 μm was a=63,500/mm$^2$, a number of magnesium/zirconium oxides with a size of 0.2-2 μm was b=500/mm$^2$, and a and b did not satisfy relational expressions 10<a/b<100 and 10$^4$<a+10b<10$^5$.

A preparation method for the above steel included the following processing steps: molten iron was smelted into molten steel by a converter, the steel was tapped to a ladle, and an argon gas was blown at a bottom during smelting and tapping. The ladle was transported to the refining station for LF refining, and components and temperature of the molten steel were adjusted. A gas used during refining was an argon gas. Alloys with various elements were added separately, the components of the molten steel were adjusted to meet the requirements of the components of the steel plate, and the steel left the station. The molten steel was cast with full protection to obtain a billet.

The billet was hot charged into a heating furnace for heating at 1,150° C. for 60 min. The heated billet was sent to a rolling mill for rolling, and subjected to primary rolling at 1,100° C. and final rolling at 780° C. The rolled steel was cooled to a room temperature, so as to obtain the high-strength steel plate.

Under conditions that a preheating temperature of the steel plate was 80° C. and a welding heat input was 15 kJ/cm, the heat-affected zone during welding had impact toughness of 35 J at −40° C. Under conditions of no preheating and a welding heat input of 100 kJ/cm, the heat-affected zone during welding had impact toughness of 18 J at −40° C. In the 100 kJ/cm heat-affected zone during welding of the steel plate, a number of titanium/boron nitrides with a size of 0.02-0.2 μm was a=55,000/mm$^2$, a number of magnesium/zirconium oxides with a size of 0.2-2 μm was b=400/mm$^2$, and a and b did not satisfy relational expressions 5<a/b<50 and 10$^4$<2a+10b<10$^5$.

However, the comparative example does not optimally control the distribution of oxides and nitrides, and the welding properties are difficult to meet the requirements.

What is claimed is:

1. A steel comprising the following chemical components by mass fraction:
   0.03-0.16% of C,
   0.05-0.5% of Si,
   1.0-1.9% of Mn,
   0.002-0.02% of P,
   0.001-0.01% of S,
   0.005-0.07% of Al,
   0.005-0.04% of Ti,
   0.1-0.5% of Cr,
   0.0005-0.005% of B,
   0.002-0.01% of Mg+Zr,
   0.001-0.008% of O,
   0.004-0.01% of N, and
   the balance of Fe and residual elements; and
a compound containing titanium nitride or boron nitride in the steel is recorded as titanium/boron nitride, and a compound containing magnesium oxide or zirconium oxide is recorded as magnesium/zirconium oxide; an area number density of the titanium/boron nitride with a size of 0.02-0.2 μm in the steel is recorded as a/mm$^2$, and an area number density of the magnesium/zirconium oxide with a size of 0.2-2 μm is recorded as b/mm$^2$; in a steel matrix, a and b satisfy relational expressions 10<a/b<100 and 10$^4$<a+10b<10$^5$; and in a heat-affected zone during steel welding, a and b satisfy relational expressions 5<a/b<50 and 10$^4$<2a+10b<10$^5$.

2. The steel according to claim 1, further comprising the following chemical components by mass fraction: one or more selected from the group consisting of 0.1-0.5% of Mo, 0.1-0.5% of Ni, 0.1-0.5% of Cu, 0.01-0.06% of Nb, and 0.01-0.06% of V.

3. The steel according to claim 1, wherein in the steel matrix, by a number of particles, 3-30% of the magnesium/zirconium oxide with a size of 0.2-2 μm is attached to the titanium/boron nitride.

4. The steel according to claim 1, wherein under conditions that a preheating temperature of the steel is lower than 100° C. and a welding heat input is 5-50 kJ/cm, and under conditions that the preheating temperature is lower than 50° C. and the welding heat input is 50-500 kJ/cm, the heat-affected zone during welding has impact toughness greater than or equal to 47 J at −40° C.

5. The steel according to claim 2, wherein under conditions that a preheating temperature of the steel is lower than 100° C. and a welding heat input is 5-50 kJ/cm, and under conditions that the preheating temperature is lower than 50° C. and the welding heat input is 50-500 kJ/cm, the heat-affected zone during welding has impact toughness greater than or equal to 47 J at −40° C.

6. The steel according to claim 3, wherein under conditions that a preheating temperature of the steel is lower than 100° C. and a welding heat input is 5-50 kJ/cm, and under conditions that the preheating temperature is lower than 50° C. and the welding heat input is 50-500 kJ/cm, the heat-affected zone during welding has impact toughness greater than or equal to 47 J at −40° C.

\* \* \* \* \*